United States Patent
Suryanarayana et al.

(10) Patent No.: US 7,242,950 B2
(45) Date of Patent: Jul. 10, 2007

(54) LOCATION DETERMINATION USING HISTORICAL DATA

(75) Inventors: Lalitha Suryanarayana, Austin, TX (US); David Patron, Cedar Park, TX (US)

(73) Assignee: SBC Properties, L.P., Reno, NV (US)

( * ) Notice: Subject to any disclaimer, the term of this patent is extended or adjusted under 35 U.S.C. 154(b) by 472 days.

(21) Appl. No.: 10/369,147

(22) Filed: Feb. 18, 2003

(65) Prior Publication Data

US 2004/0162090 A1    Aug. 19, 2004

(51) Int. Cl.
*H04Q 7/20* (2006.01)
(52) U.S. Cl. .................. 455/456.5; 455/456.2
(58) Field of Classification Search ............ 455/456.1, 455/456.5, 422, 450, 456, 41.2, 457, 412.1, 455/412.2, 550.1; 370/329, 401, 338; 709/223, 709/224
See application file for complete search history.

(56) References Cited

U.S. PATENT DOCUMENTS

| 6,871,077 | B2 * | 3/2005 | Kennedy, Jr. ............ 455/456.5 |
| 7,096,030 | B2 * | 8/2006 | Huomo ................... 455/456.3 |
| 2002/0006788 | A1 * | 1/2002 | Knutsson et al. ........... 455/422 |
| 2002/0022491 | A1 * | 2/2002 | McCann et al. ............ 455/456 |
| 2003/0025599 | A1 * | 2/2003 | Monroe ...................... 340/531 |
| 2003/0181211 | A1 * | 9/2003 | Razavilar et al. ........... 455/450 |
| 2003/0195008 | A1 * | 10/2003 | Mohi et al. ............... 455/456.5 |
| 2004/0009751 | A1 * | 1/2004 | Michaelis et al. ............ 455/62 |
| 2004/0028017 | A1 * | 2/2004 | Whitehill et al. ........... 370/338 |
| 2004/0054767 | A1 * | 3/2004 | Karaoguz et al. ........... 709/223 |
| 2004/0066757 | A1 * | 4/2004 | Molteni et al. ............. 370/329 |
| 2004/0072581 | A1 * | 4/2004 | Tajima et al. ............ 455/456.1 |
| 2004/0156372 | A1 * | 8/2004 | Hussa ........................ 370/401 |

FOREIGN PATENT DOCUMENTS

JP    2004140459 A    *    5/2004

\* cited by examiner

*Primary Examiner*—Duc M. Nguyen
*Assistant Examiner*—Chuck Huynh
(74) *Attorney, Agent, or Firm*—Brinks Hofer Gilson & Lione

(57) ABSTRACT

A plurality of wireless network access points (NAPs) each having a known location are provided. The wireless NAPs comprise shorter-range NAPs and longer-range NAPs. An associated precedence is assigned to each of the NAPs. A history database is to track a sequence of the NAPs accessed by a wireless device in a session. If a request for information from the wireless device is received by at least two of the NAPs, a processor determines which of the at least two NAPs has a greatest precedence and assigns same as a current NAP. The processor estimates a current location of the wireless device based on the known location of the current NAP and the known location of a previously-current NAP for the wireless device from the history database.

16 Claims, 4 Drawing Sheets

LOCATION DETERMINATION USING HISTORICAL DATA

BACKGROUND OF THE INVENTION

1. Field of the Invention

The present invention relates to methods and systems for determining a location of a wireless network access device.

2. Description of the Related Art

Location determination in a local wireless network area may be carried out using a network-based method. A network-based method involves tagging location data to each of a plurality of network access points (NAPs). The location of an access device (e.g. a hand held computer having wireless networking capability) can be approximated by the location of the NAP that is serving the access device. Alternatively, the location of an access device can be determined using a device/client-based method. An example of a device-based method involves use of a global positioning system (GPS) receiver. The GPS receiver is attached to the access device to provide GPS data. The GOS data is relayed by the access device to a location system. The location system maps the GPS data to a relevant location.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE PREFERRED EMBODIMENTS

Disclosed herein are methods and systems for determining an approximation to the location of a user within a geographical area covered by wireless connectivity. The estimated location of the user is based on wireless access point location information, along with geography information, previous historical events data, immediate movement history pertaining to the user, and data contained in requests for information from the user when using a wireless-enabled device.

The methods and systems use a learn-as-you-go approach to location determination. Historical information about movements and location is continuously collected in a history database. The accuracy of an estimate of a location is commensurate with the amount of historical information gathered and processed. The geographical information and historical data are combined in heuristic ways to improve the accuracy of determining the location of a user. The heuristics can be expanded to include other fine tuning methods such as genetic algorithms or pattern matching to improve the accuracy of determining the location.

Figure 1:
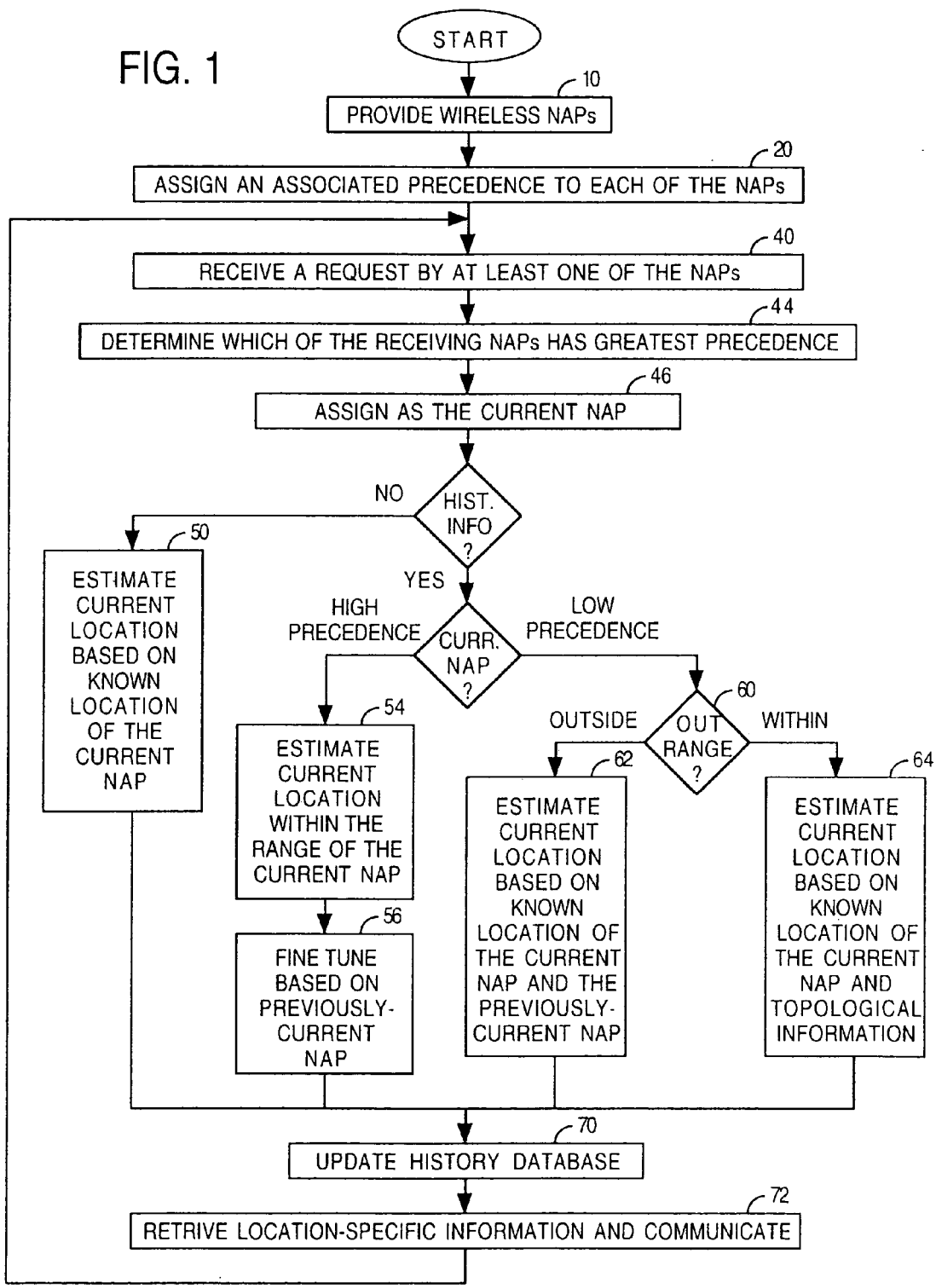
FIG. 1 is a flow chart of an embodiment of a method of location determination.
Figure 2:
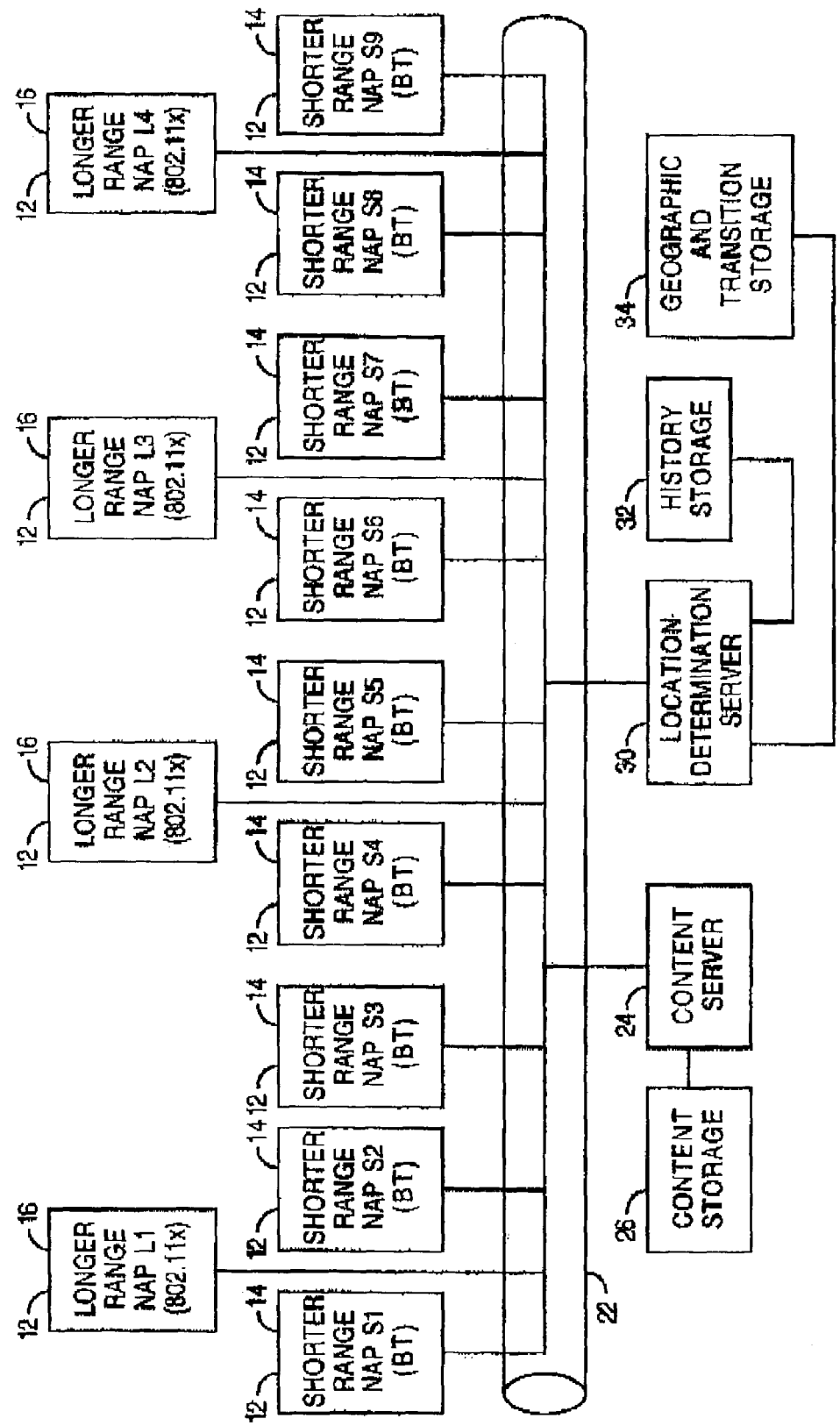
FIG. 2 is a block diagram of an embodiment of a system for location determination.

Embodiments of the present invention are described with reference to FIG. 1, which is a flow chart of an embodiment of a method of location determination, and FIG. 2, which is a block diagram of an embodiment of a system for location determination.

As indicated by block 10, the method comprises providing a collection of wireless network access points (NAPs) 12. Each of the NAPs 12 has a known location used to estimate locations of wireless devices in communication therewith. The NAPs 12 comprise multiple shorter-range NAPs 14 and multiple longer-range NAPs 16. Each of the longer-range NAPs 16 provides a wider coverage range than each of the shorter-range NAPs 14. In one embodiment, each of the longer-range NAPs 16 comprises an IEEE 802.11 NAP, and each of the shorter-range NAPs 14 comprises a Bluetooth NAP. As used herein, 802.11 should be construed as being inclusive of any 802.11-based technology or protocol, including but not limited to 802.11a, 802.11b, 802.11g. In another embodiment, each of the longer-range NAPs 16 comprises a first 802.11 technology (e.g. 802.11b) NAP, and each of the shorter-range NAPs 14 comprises a second 802.11 technology (e.g. 802.11a). It is noted that in general, the present disclosure contemplates that non-802.11 and non-Bluetooth wireless technologies and/or protocols may be employed in the NAPs 12.

Figure 3:
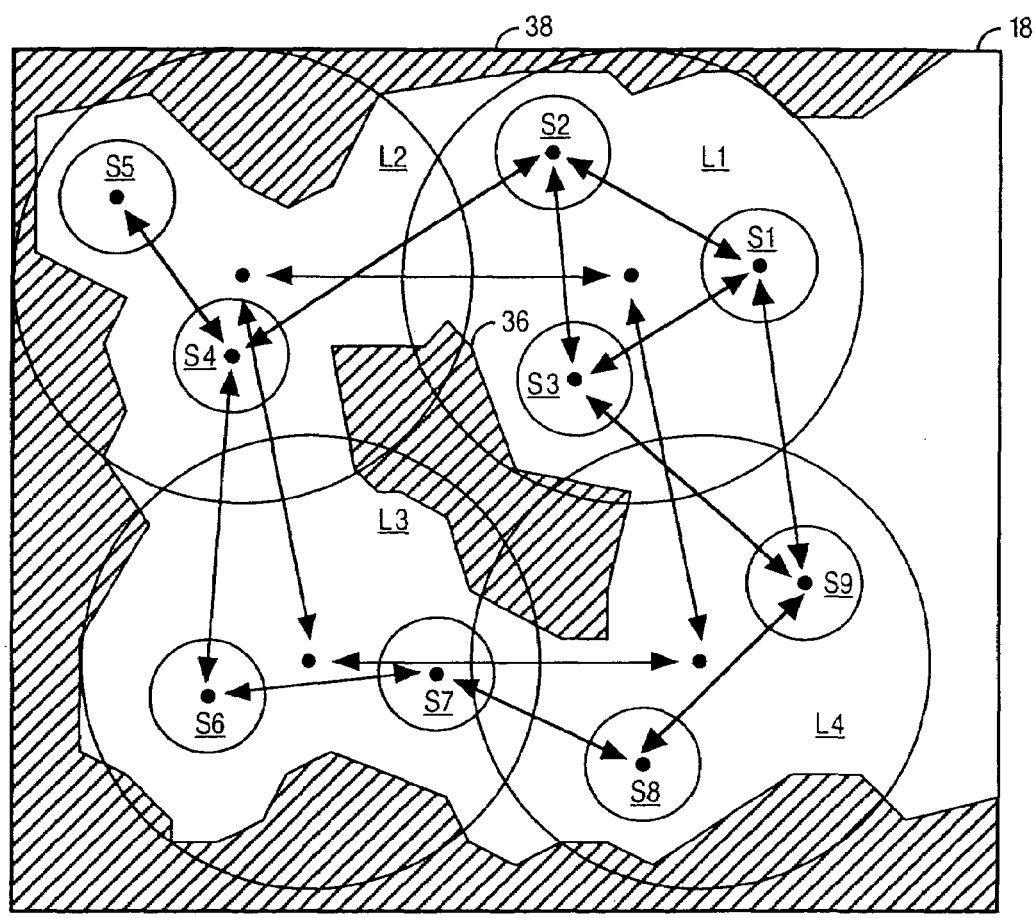
FIG. 3 depicts an example of NAP deployment in a geographical area.

An example of NAP deployment in a geographical area 18 is depicted in FIG. 3. Examples of the geographical area 18 include, but are not limited to, an amusement park, a campus, a downtown area, a park, and any area that users carry a wireless-enabled portable device such as a handheld computer, a personal digital assistant, or a wireless telephone.

In this example, four longer-range NAPs, having ranges depicted by circular areas L1, L2, L3 and L4, are deployed. Nine shorter-range NAPs, having ranges depicted by circular areas S1, S2, S3, S4, S5, S6, S7, S8 and S9, are deployed. Each of the NAPs is located approximately at a center point of its corresponding circular range.

As those having ordinary skill will recognize, the range of each NAP is not necessarily circular in practice. Thus, the scope of this disclosure should not be construed as being limited to circular ranges for each of the NAPs, which are depicted without loss of generality.

The ranges S1, S2 and S3, and their associated shorter-range NAPs, are contained within the range L1. The ranges S4 and S5, and their associated shorter-range NAPs, are contained within the range L2. The ranges S6 and S7, and their associated shorter-range NAPs, are contained within the range L3. The ranges S8 and S9, and their associated shorter-range NAPs, are contained within the range L4.

As indicated by block 20, the method comprises assigning an associated precedence to each of the NAPs 12. Each of the shorter-range NAPs 14 located within a range of one of the longer-range NAPs 16 is assigned a higher precedence than said one of the longer-range NAPs 16. Thus, the shorter-range NAPs associated with the ranges S1, S2 and S3, have a higher precedence than the longer-range NAP associated with the range L1. The shorter-range NAPs associated with the ranges S4 and S5 have a higher precedence than the longer-range NAP associated with the range L2. The shorter-range NAPs associated with the ranges S6 and S7 have a higher precedence than the longer-range NAP associated with the range L3. The shorter-range NAPs associated with the ranges S8 and S9 have a higher precedence than the longer-range NAP associated with the range L4. Each shorter-range NAP has a higher precedence than each longer-range NAP.

Referring back to FIG. 2, the NAPs 12 provide access to a network 22. The network 22 provides access to a content server 24 that provides location-based services and information within the geographical area 18. For example, the content server 24 may provide directions to and/or information about rides and attractions in an amusement park, building information on a campus, store information in a downtown area, information about different restaurants (e.g. menus, dinner specials or other special meal offers), information about entertainment events (e.g. show times, parental ratings), and landmark information in a park.

Content storage 26 hosts both location-sensitive content and general content. The location-sensitive content relates different locations with different associated information. In one embodiment, the content storage 26 relates relevant information for each particular NAP. For example, the relevant information for locations within the range of a particular NAP may indicate what rides in an amusement park are close to the particular NAP. The content server 24 bundles relevant location-sensitive content with general content, both obtained from the content storage 26, once the location of a user has been identified.

An intelligent location determination server 30 in the network 22 uses heuristic methods to deduce or otherwise estimate a location of a user. As described in more detail hereinafter, the location determination server 30 uses the known geographic locations of the NAPs 12, topological information for the geographical area 18, transition data, history data and temporal data to estimate the location of a user. Two types of history data are used: (a) a history of the location of a device within the context of a session, and (b) previous historical data including locations of a device by one or more other users at particular instants in time.

The history data is stored by history database storage 32. The history database storage 32 stores events regarding the movement of users within the geographical area 18. History data is continually collected for the users for statistical analyses. The history data may comprise historical location information for each wireless device. The historical location information may comprise a corresponding sequence of NAPs accessed by each wireless device. The history database storage 32 may be absent historical location information for a wireless device that is initially entering the geographical area 18. Optionally, the historical location information is initialized for each session of a wireless device within the geographical area 18.

The geographical and transition data is stored by a storage 34. The geographical and transition storage 34 contains topological data that is used to rule out potential locations of users within the geographical area 18. For example, FIG. 3 depicts areas 36 and 38 that the user may not be located in the geographical area 18. The area 36 may correspond to a lake in the middle of the geographical area 18. The area 38 may correspond to thick brush around the periphery of the geographical area 18. All of the NAPs 12 are mapped against the topological information of the geographical area 18 in a preparation stage.

The geographical and transition storage 34 also contains transition data representing possible paths that people may walk or otherwise travel within the geographical area 18. The transition data indicates possible paths from one NAP to another NAP, e.g. side walks or walk paths between points. The transition data is used to determine locations as people move from the range of one NAP to another NAP. In one embodiment, the transition data is stored as a transition table. FIG. 3 illustrates an example of possible paths by two-way arrows. The history database storage 32 can deduce frequently-traveled paths which is used with probabilistic data to determine/predict location.

The content storage 26, history database storage 32, and geographic and transition storage 34 are embodied by computer-readable media having stored computer-readable data stored thereon. Examples of the computer-readable media include, but are not limited to, magnetic media, optical media and electronic media.

The content server 24 and the location determination server 30 are embodied by one or more computer systems. Each computer system has at least one processor which executes acts based on computer program code. The computer program code is stored as computer-readable data on a computer-readable medium.

As indicated by block 40, the method comprises receiving, by at least one of the NAPs 12, a request for information from a wireless device. The request contains an identifier of the wireless device and/or its user, and identifier(s) of the receiving NAP(s).

Examples of the wireless device include, but are not limited to, a handheld computer, a personal digital assistant, or a wireless telephone. Regardless of its specific form, the wireless device has at least one wireless transceiver to communicate with the NAPs 12. The wireless device may comprise a first wireless transceiver to communicate with the shorter-range NAPs 14 and a second wireless transceiver to communicate with the longer-range NAPs 16. The first wireless transceiver may comprise a Bluetooth transceiver, and the second transceiver may comprise an 802.11 transceiver.

For purposes of illustration and example, consider a user who is walking around an amusement park. The user may request directions to and/or information about rides and attractions close to his/her current location. As another example, a user may request directions to or information about restaurants and entertainment events close to his/her current location in a downtown area. As a further example, a user may request information to locate his/her family members or friends with fine granularity within the geographical area 18.

The request is received either by one of the NAPs 12 or by at least two of the NAPs 12. If the request is received by at least two of the NAPs 12, acts of determining which of the at least two of the NAPs 12 has a greatest precedence (block 44) and assigning same as a current NAP (block 46) are performed. If the request is received by only one of the NAPs 12, the receiving one of the NAPs is assigned as the current NAP (block 46), and no act of determining the greatest precedence need be performed (i.e. block 44 may be skipped). In either case, if the request is received by one of the shorter-range NAPs 14, the one of the shorter-range NAPs 14 is assigned as the current NAP by virtue of its higher precedence over any longer-range NAP covering its range. The aforementioned acts, as well as the following location estimation acts, are performed by the location determination server 30.

The location determination server 30 accesses the history database storage 32 to determine if there is a history of location data for the present session of the wireless device. If the history database storage 32 is absent historical location information for the present session of the wireless device, a current location of the wireless device is estimated based on the known location of the current NAP (block 50). In one embodiment, the current location is estimated to be about at a central point within the range of the current NAP if there are no records of previous access points in the session.

Preferably, if there is no history for the present session, the history database storage 32 is queried to retrieve areas where other subscribers have been most likely located at the current NAP at about the time stamp. Based on this historical data, a location of highest likelihood or probability within the range of the current NAP at about the time stamp is determined, and the current location is estimated to be this location.

If the history database storage 32 includes historical information for the session of the wireless device, the current location of the wireless device is estimated based on the known location of the current NAP and the known-location of a previously-current NAP for the wireless device. It is noted that by initializing the history database for each session, only a previously-current NAP or location generated within the session is considered to estimate the location of the wireless device.

If the current NAP is a higher precedence access point (e.g. one of the shorter-range NAPs 14), the current location is estimated to be within a range of the current NAP (block 54). If the transition table includes a link between the previously-current NAP and the current NAP exists, the current location is fine-tuned to be in a sector of a range of the current NAP proximate to the known location of the previously-current NAP (block 56). The sector may comprise a quadrant of an approximately circular range proximate to the known location of the previously-current NAP. The estimate of the current location also may be based on the topological information of locations where the wireless device may not be located. The topological information is used to rule out portions of the range of the current NAP.

If the current NAP is a lower precedence access point (e.g. one of the longer-range NAPs 16), an act of determining whether or not the previously-current NAP is located outside the range of the current NAP is performed (block 60). If the previously-current NAP is located outside the range of the current NAP, the current location is estimated based on the known location of the current NAP and the previously-current NAP (block 62). In one embodiment, the current location is estimated to be within the range of the current NAP and slanted or otherwise biased toward the known location of the previously-current NAP.

If the previously-current NAP is located within the range of the current NAP, the current location is estimated based on the known location of the current NAP and the topological information (block 64). The topological information is used to eliminate areas that the user may not be located (e.g. a lake). A central point within the range and acceptable according to the topological information is assigned as the current location.

For any of the aforementioned location estimation acts, the location determination server 30 may employ additional heuristics. For example, the location determination server 30 may evaluate probable paths that a user can take based on statistical and temporal information gathered during the operation of the system, i.e. over multiple sessions of multiple wireless devices. This way, the system can learn the transportation patterns of users in the past. The probability or likelihood of a user/device to be at a particular location can be computed based upon context such as time or day or previously location.

As indicated by block 70, the method comprises updating the history database storage 32 to record the current location. This act may include any one or more of the following: recording the current NAP, recording the known location of the current NAP, recording the estimated current location, recording all NAPs that received the request, recording temporal information, recording transition information (e.g. a sequence of NAPs along a path), and recording a time stamp.

As indicated by block 72, the method comprises retrieving information associated with the estimated current location and communicating the information to the wireless device in response to the request for information. The content server 24 uses the estimated current location determined by the location determination server 30 to access location-sensitive content particular to the current location from the content storage 26. The content server 24 bundles the relevant location-sensitive content with general content once the location of a user has been identified, and communicates same to the wireless device via the network 22 and the current NAP. The bundled content is displayed by the wireless device for view by the user.

In contrast to the present disclosure, if a GPS-based location service is used, GPS information would need to be mapped to area ranges where specific sites of interest may reside. Such an approach is more complex than mapping NAPs to sites of interest.

Figure 4:
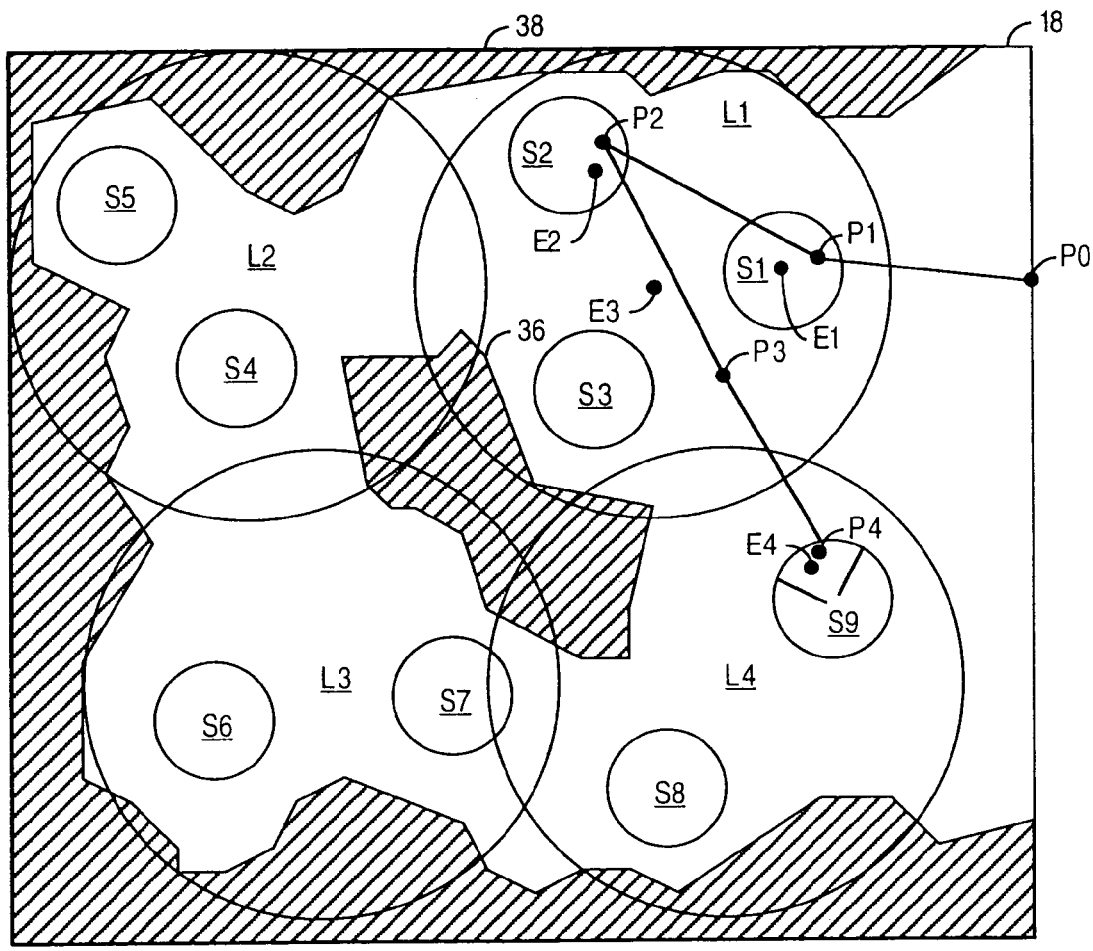
FIG. 4 illustrates an example path for a session of a user in the geographical area.

FIG. 4 illustrates an example path for a session of a user in the geographical area 18. The user walks from point P0 to point P1. At the point P1, the user submits a first request for information using a wireless device. The first request is received by the shorter-range NAP having the range S1 and the longer-range NAP having the range L1. Since the shorter-range NAP has a higher precedence than the longer-range NAP, and since this is the first request for information in the session, an estimated location E1 of the user is determined to be close to a central point E1 of the range S1. Information relevant to the estimated location E1 is communicated to the wireless device based on the first request.

From the point P1, the user walks to point P2. At the point P2, the user submits a second request for information using the wireless device. The second request is received by the shorter-range NAP having the range S2 and the longer-range NAP having the range L1. Since the shorter-range NAP has a higher precedence than the longer-range NAP, the shorter-range NAP having the range S2 is assigned to be the current NAP. Since the last request received for the user was from a NAP outside the range of the current NAP, an estimated location E2 of the user is determined to be within the range S2 and biased toward the range S1. Information relevant to the estimated location E2 is communicated to the wireless device based on the second request.

From the point P2, the user walks to point P3. At the point P3, the user submits a third request for information using the wireless device. The third request is received by only the longer-range NAP having the range L1. Therefore, this NAP is assigned to be the current NAP. Since the last request received for the user was from a NAP within the range of the current NAP, an estimated location E3 of the user is determined to be close to a central portion of the range L1. Information relevant to the estimated location E3 is communicated to the wireless device based on the third request.

From the point P3, the user walks to point P4. At the point P4, the user submits a fourth request for information using the wireless device. The fourth request is received by the shorter-range NAP having the range S9 and the longer-range NAP having the range L4. Since the shorter-range NAP has a higher precedence than the longer-range NAP, the shorter-range NAP having the range S9 is assigned to be the current NAP. Since the current NAP is a high-precedence NAP, an estimated location E4 of the user is determined to be within a quadrant of the range S9 closer to the range L1 of the last request. Information relevant to the estimated location E4 is communicated to the wireless device based on the fourth request.

It is noted that the present invention is not limited to two layers of NAPs, namely shorter-range NAPs and longer-range NAPs. In general, any number of layers of NAPs can be employed. For example, three or more layers of NAPs using three or more NAP technologies and/or frequencies and/or ranges and/or radios may be employed. The herein-disclosed algorithm can be applied under the general multi-layer scenario.

Further, the precedence of NAPs may be determined via additional criteria such as user preferences or business rules. Consider, for example, a geographical area such as an airport where there is more than one wireless local area network (WLAN) operator. The user may obtain good signals from two competing NAPs controlled by two different providers. In that case, additional criteria such as pricing, user preference on quality of service (which may be subjective), or business rules implemented by the provider (e.g. if the user is a subscriber of one provider but not the other) can be used to influence the outcome.

Preferably, historical/temporal data about a wireless device is stored anonymously, i.e. without personally identifiable information about a user. Thus, a user is not tracked per se and his/her privacy is not an issue.

It will be apparent to those skilled in the art that the disclosed invention may be modified in numerous ways and may assume many embodiments other than the preferred form specifically set out and described above. For example, the functionality of the content server 24 and the location determination server 30 may be provided by either a single server or more than two servers. As another example, the data stored by the content storage 26, the history database storage 32, and the geographical and transition information storage 34 may be stored by the same storage system.

Accordingly, it is intended by the appended claims to cover all modifications of the invention which fall within the true spirit and scope of the invention.

What is claimed is:

1. A system comprising:
  a history database to track a sequence of wireless network access points (NAPs) accessed by a wireless device in a session, the NAPs part of a plurality of NAPs each having a known location and a unique identifier, the plurality of NAPs comprising a plurality of shorter-range NAPs and a plurality of longer-range NAPs, each NAP comprising an associated precedence; and
  a location determination component to determine which of at least two NAPs that receive a request for information from the wireless device has a greatest precedence and to assign same as a current NAP, to determine whether the current NAP is a NAP of the plurality of shorter-range NAPs or the plurality of longer-range NAPs, to determine whether a previously-current NAP for the wireless device from the history database is within the range of the current NAP, and to estimate a current location of the wireless device based on the known location of the current NAP and the known location of the previously-current NAP for the wireless device from the history database;
  wherein the estimate of the current location is biased towards the previously-current NAP when the current NAP is one of the plurality of longer-range NAPs and the previously-current NAP is located outside the range of the current NAP; and
  wherein the estimate of the current location is within the range of the current NAP and not within the range of the previously-current NAP when the current NAP is one of the plurality of longer-range NAPs and the previously-current NAP is located within the range of the current NAP.

2. The system of claim 1 wherein each of the shorter-range NAPs located within a range of one of the longer-range NAPs is assigned a higher precedence than the one of the longer-range NAPs.

3. The system of claim 1 wherein each shorter-range NAP has a higher precedence than each longer-range NAP.

4. The system of claim 1 wherein the location determination component is to estimate the current location based on topological information of locations where the wireless device may not be located.

5. The system of claim 1 wherein the location determination component is to update the history database to record the current NAP.

6. The system of claim 1 wherein the location determination component is to update the history database to record the current location.

7. The system of claim 1 wherein the location determination component is to update the history database to record a time stamp.

8. The system of claim 1 wherein the location determination component is to update the history database to record NAP-to-NAP transition information.

9. The system of claim 1 wherein the longer-range NAPs comprise a plurality of 802.11 NAPs.

10. The system of claim 9 wherein the shorter-range NAPs are wireless communication NAPs operating in an unlicensed ISM band at 2.4 GHz.

11. The system of claim 1 further comprising a content server component to retrieve information associated with the current location, and to communicate the information to the wireless device in response to the request for information.

12. A method comprising:
  receiving, by at least one of a plurality of wireless network access points (NAPs), a request for information from a wireless device, the plurality of NAPs comprising a plurality of shorter-range NAPs and a plurality of longer-range NAPs;
  determining whether the request is received by one of the shorter-range NAPs;
  in response to determining the request is received by one of the shorter-range NAPs:
    assigning the shorter-range NAP receiving the request as a current NAP; and
    estimating a current location of the wireless device based on a location of the current NAP;
    wherein the current location of the wireless device is estimated based on a location of the current NAP and a last-estimated location of the wireless device when a history database includes previous location data for the wireless device in the session;
  in response to determining the request is not received by any of the shorter-range NAPs:
    assigning the longer-range NAP receiving the request as the current NAP; and
    estimating a current location of the wireless device based on a location of the current NAP;
    wherein the estimate of the current location of the wireless device is within a range of the current NAP and biased toward a location of the current NAP when the history database includes previous location data for the wireless device in the session and a last request from the wireless device was received from one of the NAPs outside a range of the current NAP;

wherein the estimate of the current location of the wireless device is within a range of the current NAP and not within a range a NAP receiving a last request from the wireless device when the history database includes previous location data for the wireless device in the session and a last request from the wireless device was received from a NAP within a range of the current NAP;

updating the history database to record the current location of the wireless device;

wherein the history database tracks locations of the wireless device in a session.

13. The method of claim 12 wherein the longer-range NAPs comprise a plurality of 802.11 NAPs.

14. The method of claim 12 wherein the shorter-range NAPs are wireless communication NAPs operating in an unlicensed ISM band at 2.4 GHz.

15. The method of claim 12 further comprising retrieving information associated with the current location and communicating the information to the wireless device in response to the request for information.

16. The method of claim 12 wherein to estimate the current location of the wireless device, the history database is queried to retrieve areas where other users have been most likely located at the current NAP and a location of highest likelihood within the range of the current NAP is determined based thereon when the history database is absent previous location data for the wireless device in the session.

* * * * *